United States Patent
Chang

(10) Patent No.: US 6,942,884 B2
(45) Date of Patent: Sep. 13, 2005

(54) ENZYME-CONTAINING BEVERAGE OBTAINED FROM NATURAL FOOD AND METHOD FOR PRODUCING THE ENZYME-CONTAINING BEVERAGE

(76) Inventor: Hung-Chih Chang, No. 3, Lane 54, Sec. 3, Jehol Rd., Taichung (TW)

( * ) Notice: Subject to any disclaimer, the term of this patent is extended or adjusted under 35 U.S.C. 154(b) by 145 days.

(21) Appl. No.: 10/386,549

(22) Filed: Mar. 13, 2003

(65) Prior Publication Data

US 2004/0180114 A1 Sep. 16, 2004

(51) Int. Cl.⁷ .................... A23B 7/155; A23L 2/02
(52) U.S. Cl. .................................... 426/51; 426/599
(58) Field of Search ............... 426/51, 52, 61, 426/655, 599

(56) References Cited

U.S. PATENT DOCUMENTS 6,395,315 B1 * 5/2002 Matsuura ............. 426/49

FOREIGN PATENT DOCUMENTS

| CN | 1273796 A | * | 11/2000 | |
|---|---|---|---|---|
| JP | 61 282059 A | * | 12/1986 | |
| JP | 09 149780 A | * | 6/1997 | |
| KR | 2001 003033 | * | 1/2001 | |
| KR | 2001 089930 | * | 10/2001 | |
| KR | 2001 099115 | * | 11/2001 | |
| KR | 336648 B | * | 5/2002 | |
| KR | 2003 015964 | * | 2/2003 | |
| KR | 2003 062024 | * | 7/2003 | |
| WO | WO 01/26484 A1 | * | 4/2001 | ........... A23L/1/212 |

* cited by examiner

*Primary Examiner*—Keith Hendricks
(74) *Attorney, Agent, or Firm*—Birch, Stewart Kolasch & Birch, LLP

(57) ABSTRACT

An enzyme-containing beverage has various types of enzymes and basically has fermentation fluid obtained form fermented vegetables and fruits and fermented pine extract, and optionally further having fermented extract from a paper-mulberry tree. A method produces the enzyme beverage for fermenting the raw materials (vegetables, fruits, pine extract, and paper-mulberry extract).

9 Claims, 1 Drawing Sheet

ENZYME-CONTAINING BEVERAGE OBTAINED FROM NATURAL FOOD AND METHOD FOR PRODUCING THE ENZYME-CONTAINING BEVERAGE

BACKGROUND OF THE INVENTION

1. Field of the Invention

The present invention relates to an enzyme-containing beverage and a method to produce the beverage, and more particularly to a beverage containing multiple enzymes obtained from fermented natural food to make a health beverage.

2. Description of Related Art

Enzymes have been reported to have significant benefits to the human body, specifically enzymes assist all biochemical activities related to metabolism. Enzymes have the following characters to cure disease:

1. Refresh blood to change the constitution of the body: enzymes lyse foreign matter such as viruses or cholesterol to cause the blood to have weak basicity, to promote blood fluidity in blood vessels, and to prevent a chronic ailment and degeneracy of the body.
2. Have an antibiotic effect: enzymes enhance healing and recovery of hemoleukocytes to promote the immune system of the body.
3. Have a decomposing effect: some enzymes catalyse the digestive juice to decompose food in the digestive system to make nutrients in food easily absorbed by the intestines.
4. Activate cells: enzymes promote cells to metabolize to generate energy and generate new cells for healing. Enzymes can even activate degenerated reproductive cells.
5. Have anti-tumor and anti-cancer effect: in cooperation with suitable medicine and nutritious substances, enzymes catalyze the medicine or nutritious substances and reduce side effects of the medicine.
6. Have a sobering effect with regard to alcohol to prevent headaches associated with a hangover.
7. Supplement nutrition and energy.

Having many advantages as mentioned above, enzyme products are popular as a health food. However, enzyme products are made in the form of solid powders or tablets and only contain a few kinds of enzymes. Therefore, conventional enzyme products cannot supply consumers with various enzymes to satisfy different requirements for enzymes in the body so the efficiency of conventional enzyme products is not significant.

SUMMARY OF THE INVENTION

To overcome the shortcomings of conventional enzyme products, the present invention provides an enzyme-containing beverage to mitigate and obviate the aforementioned problems.

A first objective of the invention is to provide various enzymes obtained from fermented natural food in a beverage form, where the beverage is composed of multiple fermented fluids in a proper proportion and enhances immunity and activation of the body.

A second objective of the invention is to provide a method for producing the beverage containing various enzymes described in the first objective.

Other objects, advantages and novel features of the invention will become more apparent from the following detailed description when taken in conjunction with the accompanying drawings.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
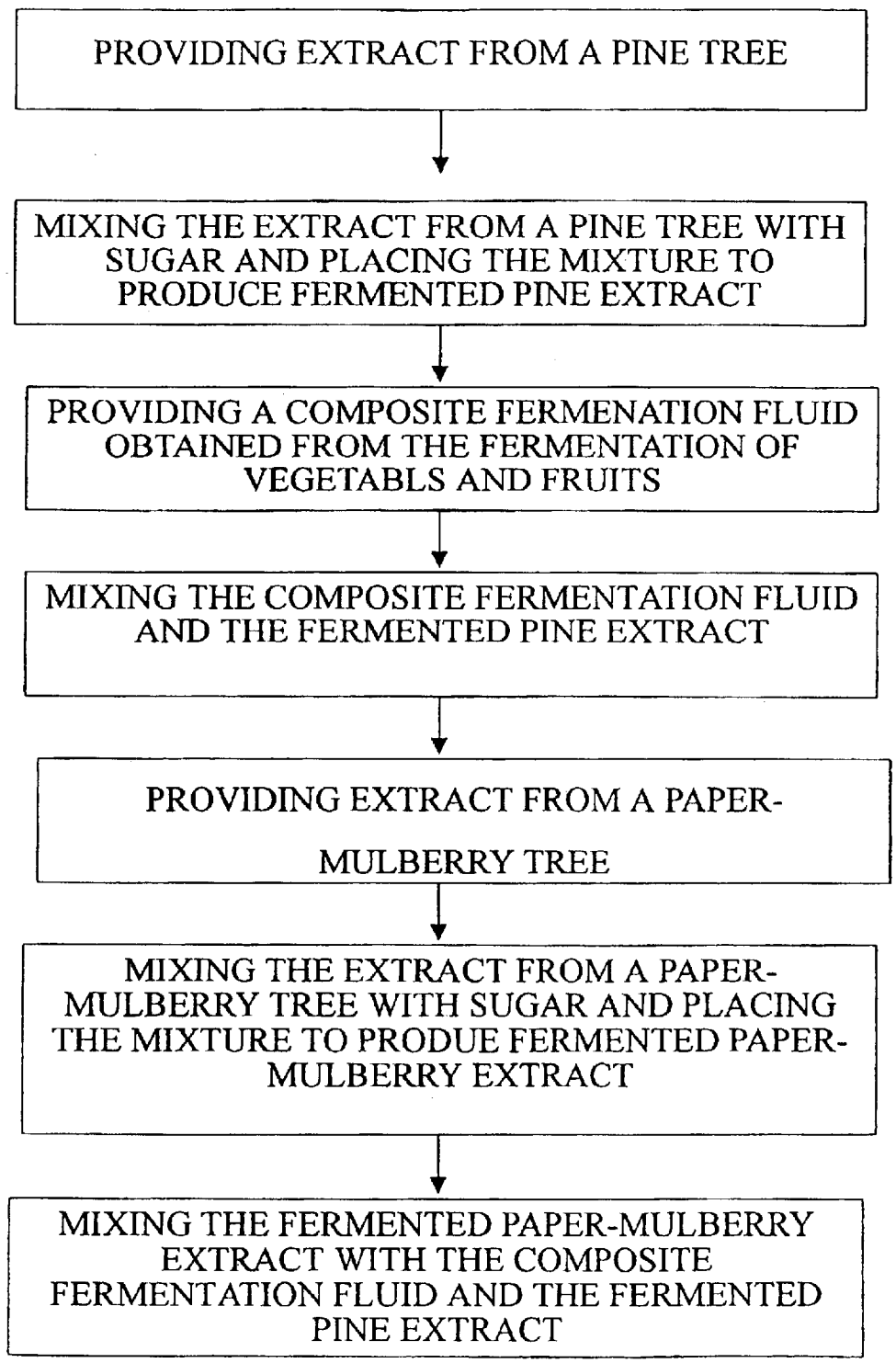
FIG. 1 is a functional block diagram of a method for producing an enzyme-containing beverage obtained from natural food in accordance with the present invention.

With reference to FIG. 1, a method for producing a beverage containing enzymes obtained from natural food in accordance with the present invention comprises the acts of: providing extract from a pine tree; mixing the extract from a pine tree with sugar and placing the mixture to produce fermented pine extract; providing a composite fermentation fluid obtained from the fermentation of vegetables and fruits; and mixing the composite fermentation fluid and the fermented pine extract to form the enzyme-containing beverage.

Parts of the pine tree are squeezed to obtain pine extract, and the extract from pine tree is stored in a container with sugar or honey. The container of pine extract is sealed and vented and stored under proper conditions at room temperature for at least one month until the pine extract ferments. After fermenting, the fermented pine extract contains plenty of enzymes. Pine extract is selectively obtained from part of a pine tree such as stems, needles, pine cones, etc. because each part of the pine has its application in folk medication. For example, needles of Japanese red pine (*pinus densiflora* S. et Z,;) contains plenty of chlorophyll, vitamin A and C, various of vitamin groups, protein, carbohydrate, oil of turpentine, iron, phosphorous, calcium, etc. so that pine extract of needles can refresh the body, enhance physical endurance, activate cells, strengthen the heart and smooth the flow of blood in blood vessels.

The composite fermentation fluid obtained from fermented vegetables and fruits is made by the following acts: providing vegetables and fruits; mixing each kind of the vegetables and fruits with sugar and vinegar and placing the mixture for at least four months to produce a fermentation fluid; separating the fermentation fluid from the fermentation of each kind of vegetable or fruit; and mixing the fermentation fluid of each kind of vegetable or fruit to form a composite fermentation fluid.

Multiple kinds of fresh vegetables and fruits are selected to provide the raw material for producing fermentation fluids and are cleaned. Large vegetables and fruits are chopped into small pieces. Each kind of vegetable and fruit is stored individually in a container and mixed with vinegar and sugar (or honey). The containers are hermetically sealed and vented and stored under proper conditions at room temperature for at least four months to ferment the vegetables and fruits and produce individual fermentation fluids. The individual fermentation fluids are separated from the residue and mixed in equal parts with each other to form a composite fermentation fluid. When the vegetables and fruits ferment completely, the fermentation fluids contain plenty of enzymes. The selected vegetables and fruits comprise lemons, grapes, apples, peaches, night-blooming cereus fruit (*Hylocereus undatus*), plums, mountain or Chinese yams (*Dioscoreaspp.*), papayas, mulberries, kumquats, red jujubes, guavas, cherries, beets and tomatoes. The vinegar is made of natural food and is selected from a group of fruit vinegar, glutinous-rice vinegar and rice vinegar. The sugar is selected from sucrose, fructose, glucose and others.

The composite fermentation fluid and the fermented pine extract are mixed to form an enzyme-containing beverage containing various enzymes. The composite fermentation fluid makes up 60~90% (w/w) of the enzyme-containing beverage, and the fermented pine extract makes up 10~40% (w/w) of the enzyme-containing beverage.

The enzyme-containing beverage may be further mixed with fermented paper-mulberry extract to enhance the variety and efficiency of the enzyme beverage. Therefore, the method for producing the enzyme-containing beverage may further comprise acts of: providing extract from a paper-mulberry tree (*Broussoneta papyrifera* (L.)); mixing the extract from a paper-mulberry tree with sugar and placing the mixture to produce the fermented paper-mulberry extract; and mixing the fermented paper-mulberry extract with the mixture of the composite fermentation fluid and the fermented pine extract.

Parts of the paper-mulberry tree are squeezed to obtain paper-mulberry extract. Then, the paper-mulberry extract is hermetically stored in a vented container and mixed with sugar or honey under proper conditions at room temperature for at least one month until the paper-mulberry extract ferments. After fermenting, the fermented paper-mulberry extract contains plenty of enzymes. The paper-mulberry extract is selectively obtained from any parts of a paper-mulberry tree because each part of the paper-mulberry tree has its application. For example, leaves of the paper-mulberry tree are uretic. Fruits of paper-mulberry fruit were reported to be capable of treating liver ailments and impotence.

The fermented paper-mulberry extract is mixed with the mixture of the composite fermentation fluid and the fermented pine extract in a concentration of 3%~15% (w/w) of the mixture of the composite fermentation fluid and the fermented pine extract.

Because condensation and numbers of each enzyme increase after fermenting, the fermented vegetable and fruit fluids, fermented pine extract and fermented paper-mulberry extract contain plenty of enzymes. After mixing the fermented fluids and extracts together, various enzymes interact and produce auxiliary effects. As described, the enzyme beverage contains multiple kinds of enzymes and enhances immunity and activation of the body.

Although the invention has been explained in relation to its preferred embodiment, many other possible modifications and variations can be made without departing from the spirit and scope of the invention as hereinafter claimed.

What is claimed is:

1. A method for producing an enzyme-containing beverage, comprising:
   providing extract from a pine tree;
   mixing the extract from a pine tree with sugar and placing the mixture under fermentation conditions for at least one month to produce fermented pine extract;
   providing a composite fermentation fluid obtained from the fermentation of vegetables and fruits;
   mixing the composite fermentation fluid and the fermented pine extract to form basic mixture of the composite fermentation and the fermented pine extract;
   providing extract from a paper-mulberry tree (*Broussoneta papyrifera* (L.));
   mixing the extract from a paper-mulberry tree with sugar and then placing the extract under fermentation conditions for at least one month to produce the fermented paper-mulberry extract; and
   mixing the fermented paper-mulberry extract with the basic mixture of the composite fermentation fluid and the fermented pine extract.

2. The method as claimed in claim 1, comprising the following acts to provide the composite fermentation fluid:
   providing vegetables and fruits;
   mixing each kind of vegetables, and fruits with sugar and vinegar to compose a mixture of the vegetables, the sugar and the vinegar or a mixture of the fruit, the sugar and the vinegar;
   placing the mixture of each kind of vegetable and fruit for at least four months under fermentation conditions to ferment;
   separating fermentation fluid from the mixture of each kind of the vegetable or the fruit; and
   mixing the fermentation fluid of each kind of the vegetable or the fruit to form the composite fermentation fluid.

3. The method as claimed in claim 2, wherein the composite fermentation fluid is 60~90% (w/w) of the enzyme-containing beverage and the fermented pine extract is 10~40% (w/w) of the enzyme-containing beverage.

4. The method as claimed in claim 1, comprising mixing the fermented paper-mulberry extract with the mixture of the composite fermentation fluid and the fermented pine extract, wherein the fermented paper-mulberry extract is in an amount of 3%~15% (w/w) of the mixture of the composite fermentation fluid and the fermented pine extract.

5. The method as claimed in claim 2, wherein the vinegar is selected from the group consisting of fruit vinegar, glutinous-rice vinegar, and rice vinegar.

6. The method as claimed in claim 3, wherein the vinegar is selected from the group consisting of fruit vinegar, glutinous-rice vinegar, and rice vinegar.

7. The method as claimed in claim 1, wherein the sugar is selected from group consisting of: sucrose, fructose, and glucose.

8. The method as claimed in claim 2, wherein the vegetables and fruits comprise lemons, grapes, apples, peaches, night-blooming cereus fruit (*Hylocereus undatus*), plums, mountain or Chinese yams (*Dioscoreaspp.*), papayas, mulberries, kumquats, red jujubes, guavas, cherries, beets and tomatoes.

9. An enzyme-containing beverage comprising:
   a basic mixture of a fermented pine extract and a composite fermentation fluid from fermented vegetables and fruits, wherein
   the fermented pine extract in an amount of 10~40% (w/w) of the basic mixture of the enzyme-containing beverage; and
   the composite fermentation fluid from the fermentation of vegetables and fruits in an amount of 60~90% (w/w) of the basic mixture of the enzyme-containing beverage; and
   a fermented paper-mulberry extract in the amount of 3~15% (w/w) of the basic mixture of the fermented pine extract and the composite fermentation fluid.

* * * * *